United States Patent [19]

Strongwater

[11] Patent Number: 5,735,991
[45] Date of Patent: Apr. 7, 1998

[54] METHOD FOR SEALING AND CUTTING PADS AND MOVING THE SEALED AND CUT PADS TO A TAKE OFF POSITION BY A MOVING SUPPORT

[75] Inventor: Bruce Strongwater, Englewood, N.J.

[73] Assignee: Olympus Optical Co., Ltd., Tokyo, Japan

[21] Appl. No.: 546,369

[22] Filed: Oct. 20, 1995

[51] Int. Cl.⁶ .................................................. B32B 31/00
[52] U.S. Cl. ........................ 156/268; 156/239; 156/267; 264/163; 264/294; 264/299; 264/319; 264/345
[58] Field of Search .......................... 156/164, 168, 156/230, 235, 238, 239, 267, 268, 324; 264/328.1, 297.5, 304, 318, 163, 294, 299, 319, 345

[56] References Cited

U.S. PATENT DOCUMENTS

| | | | |
|---|---|---|---|
| 3,497,410 | 2/1965 | Zagusta et al. | 156/233 |
| 4,717,438 | 1/1988 | Benge et al. | 156/152 |
| 4,846,922 | 7/1989 | Benge et al. | 156/324 |
| 5,184,111 | 2/1993 | Pichl | 340/572 |

*Primary Examiner*—Merrick Dixon
*Attorney, Agent, or Firm*—Louis Weinstein

[57] ABSTRACT

Method for producing pads in which a laminated pad sheet is fed from a supply roll through a combined sealer/cutter. The laminated pad sheet is indexed into the sealer/cutter with a support sheet of a predetermined thickness. The sealer/cutter moves a perimeter pattern defining a sealing electrode into engagement with the laminated pad. Electrical energy is applied across the sealing electrode and a conductive, grounded plate forming a pad per/meter seal. A support plate upon which the perimeter forming electrode is mounted is moved further toward the pad when the power is turned off, causing a cutting edge surrounding the sealing electrode to pierce completely through the laminate pad and only partially through the support sheet. The pad sheet and support sheet are indexed to feed the next portion of the pad sheet into the sealer/cutter, simultaneously advancing the sealed and cut pad and support sheet to a take-off position where the severed pad, supported by the support sheet, is safely removed from the pad sheet and support sheet. The support sheet is wound about a take-up spool for reuse. When sealing and severing of pads form one pad sheet is completed, the support sheet is rewound upon the supply spool and is shifted slightly in a lateral direction to displace previously made cuts in the support sheet from the cutting blade preparatory to a new sealing/cutting operation.

19 Claims, 2 Drawing Sheets

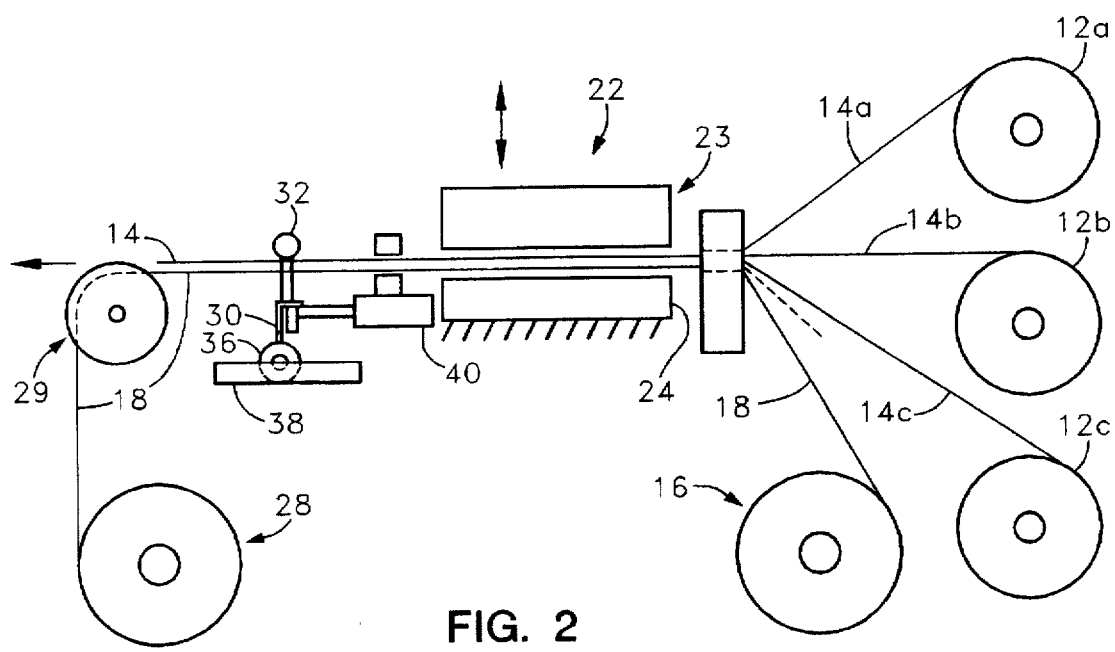
FIG. 2
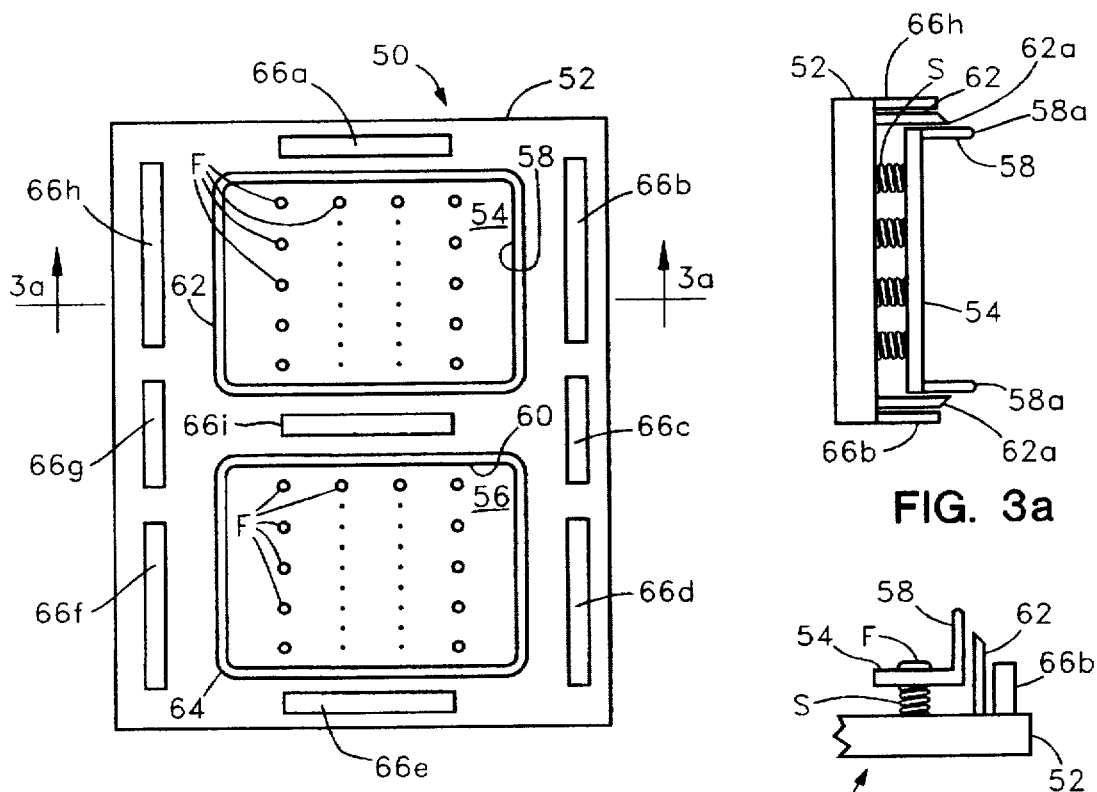
FIG. 3
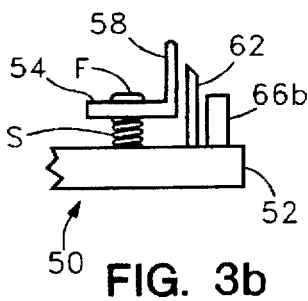
FIG. 3a
FIG. 3b 5,735,991

METHOD FOR SEALING AND CUTTING PADS AND MOVING THE SEALED AND CUT PADS TO A TAKE OFF POSITION BY A MOVING SUPPORT

FIELD OF THE INVENTION

The present invention relates to a method and apparatus for sealing and severing pads from a laminated pad sheet and more particularly to a novel method and apparatus for performing said method in which the pad sheet arranged on a support web, is indexed into a sealer/cutter and severed pads are displaced from the sealer/cutter as a new sealing/cutting operation is performed, to facilitate safe removal of severed pads and which is further designed to significantly increase the useful operating life of the support sheet.

BACKGROUND OF THE INVENTION

Pads, having characteristics of being moisture or liquid absorbent and having a sublayer, or middle layer which serves as a vapor or liquid barrier are extremely advantageous for use as bed pads, diaper changing pads, burping pads and the like. One typical pad construction is described in detail in U.S. Pat. No. 5,391,418 which is incorporated herein by reference thereto. Briefly, the pad described therein is comprised of a pair of non-woven, fibrous layers separated by a moisture or liquid barrier sheet. The fibrous layers and vapor barrier sheet are formed of suitable plastic materials and are joined together by applying electromagnetic energy which fuses the three sheets to one another.

The three sheets are fed into sealing apparatus, each of the three sheets being advanced from supply rolls.

A reciprocating die mounted within the sealer apparatus presses the three layers between an electrode defining the pad and an electrode which is grounded. Electrical energy coupled across the aforesaid electrodes causes the three sheets to be laminated to one another at locations where the electrode of the die engages and presses the three sheets together between the die electrode and the grounded electrode.

In one preferred embodiment, the laminated pads are initially formed, the resulting pad sheet being wound upon a supply spool.

The pads must now be cut and severed from the pad sheet for subsequent packaging. Conventional techniques employ a sealer electrode and a cutter which respectively seal the perimeter of the pad and thereafter cut and sever the pad from the laminated pad sheet in separate, sequential operations. Severed pads are removed by displacing the reciprocating die from the grounded electrode and lifting the severed pad out from between the electrodes, placing the operator in danger of being struck by a moving part or of being burned by the electrodes or other metallic parts which are heated by the electromagnetic energy, making it extremely hazardous for operators to remove the severed pads. As an alternative, allowing the electrodes to cool sufficiently to enable an operator to safely remove the severed pads significantly increases production time and costs.

BRIEF DESCRIPTION OF THE INVENTION

The present invention is characterized by providing method and apparatus for sealing pads and severing the sealed pads from a laminated pad sheet utilizing a support sheet which serves as a moving support for supporting pads which have been severed from the laminated pad sheet and indexing the support sheet and severed pads to a position displaced a safe distance from the sealer/cutter apparatus enabling an operator to safely remove the severed pad at the aforesaid displaced location thereby completely isolating an operator from the danger of the heated, reciprocating parts of the sealer/cutter apparatus.

The laminated pad sheet is fed from a supply spool together with an elongated support web fed from a support web supply spool so that the laminated pad sheet is resting upon the support web. The laminated pad sheet and support web are simultaneously indexed into the sealer/cutter apparatus containing at least one reciprocating die assembly comprised of a perimeter defining seal electrode and a cutter blade encircling the perimeter defining electrode.

The cutting blade is fixedly secured to a die assembly support member while the perimeter defining electrode is resiliently mounted to the support member.

Initially, both the perimeter defining electrode and the cutting blade extend from the support member and project toward the pad sheet, the perimeter defining electrode extending a greater distance from the surface of the support member than cutting edge of cutting blade.

When the laminated pad sheet and support web have been properly indexed into the sealer/cutter apparatus, the support member is moved toward the grounded electrode upon which the support web is supported, causing the perimeter defining electrode to be firmly pressed into the laminated pad sheet. The distance which the support member is moved is controlled so that the cutting blade is displaced from the laminated pad sheet.

Electromagnetic energy is coupled across the cooperating electrodes, causing a seal to be formed in the pad sheet, which seal substantially defines the perimeter of the pad to be produced.

Thereafter, the source of electromagnetic energy is turned off and the support member is pressed a further distance into the laminated pad sheet. The spring members supporting the perimeter defining electrode enable the perimeter defining electrode to yield and thereby move closer to the support member while the cutting edge of the cutting blade cuts completely through the laminated pad sheet. Stop members provided on the support member at spaced locations about the cutting blade limit the travel distance of the support member so that the cutting blade, while completely severing the laminated pad sheet, is permitted to only partially penetrate into the support web.

The reciprocally mounted die member is then lifted upwardly after the cutting operation so as to be displaced from the support web and laminated pad sheet whereupon the support web and pad sheet are again advanced to place the next portion of the laminated pad sheet within the sealer/cutter apparatus and to move the just severed pad to a position displaced from the sealer/cutter apparatus by a distance sufficient to enable an operator to lift the severed pad off of the support web without danger of coming into contact with any of the heated and/or reciprocating components of the sealer/cutter apparatus. The support web having been only partially penetrated by the cutting edge of the blade, completely and adequately supports severed pads which have been advanced to a take-off position. The stop members provided on the support member of the die assembly prevent complete penetration of the cutting blade through the support web.

The remaining portion of the laminated pad sheet is discarded while the support web is wound about a take-up spool for reuse. To significantly increase the longevity of the useful operating life of the support web, the support web, which is rewound upon the original support web supply spool is moved a small, given distance in an axial direction so as to displace the previous penetrations of the cutting blade into the support web from the locations which the support web will be cut during a subsequent sealing/cutting operation, thereby significantly increasing the useful operating life of the support web, which is formed of a relatively expensive material.

The above-mentioned method and apparatus for performing the method yields a technique having productivity levels which are significantly increased as compared with conventional techniques and further assures that operators may handle and remove severed pad sheets safely and without danger of being injured.

The method and apparatus as described hereinabove for sealing and cutting pads from laminated pad sheets may also incorporate initial forming of such pads together with the sealing and cutting operations as will be described in greater detail hereinbelow.

OBJECTS OF THE INVENTION

It is therefore one object of the present invention to provide a novel method and apparatus for sealing and cutting pads from a laminated pad sheet.

It is still another object of the present invention is to provide a novel method and apparatus for sealing and cutting pads from a laminated pad sheet at production speeds not heretofore obtainable through conventional techniques.

Still another object of the present invention to provide a novel method and apparatus for sealing and cutting pads and the like from laminated pad sheets and which utilizes a support web to advance pads severed from a pad sheet to a position safely displaced from sealer/cutter apparatus to facilitate safe removal of completed pads from the aforesaid apparatus.

BRIEF DESCRIPTION OF THE FIGURES

The above as well as other objects of the present invention will be become apparent when reading the accompanying description and drawings in which:

FIG. 2 shows an alternative embodiment of the present invention in which apparatus is provided for forming, sealing and cutting pads.

FIG. 3 shows a plan view of a die member utilized in the embodiments of FIGS. 1 and 2.

FIG. 3a shows a sectional view of the die assembly of FIG. 3 looking in the direction of arrows 3a—3a.

FIG. 3b shows a detailed sectional view of the die member of FIG. 3.

DETAILED DESCRIPTION OF THE INVENTION AND PREFERRED EMBODIMENTS THEREOF

Figure 1A:
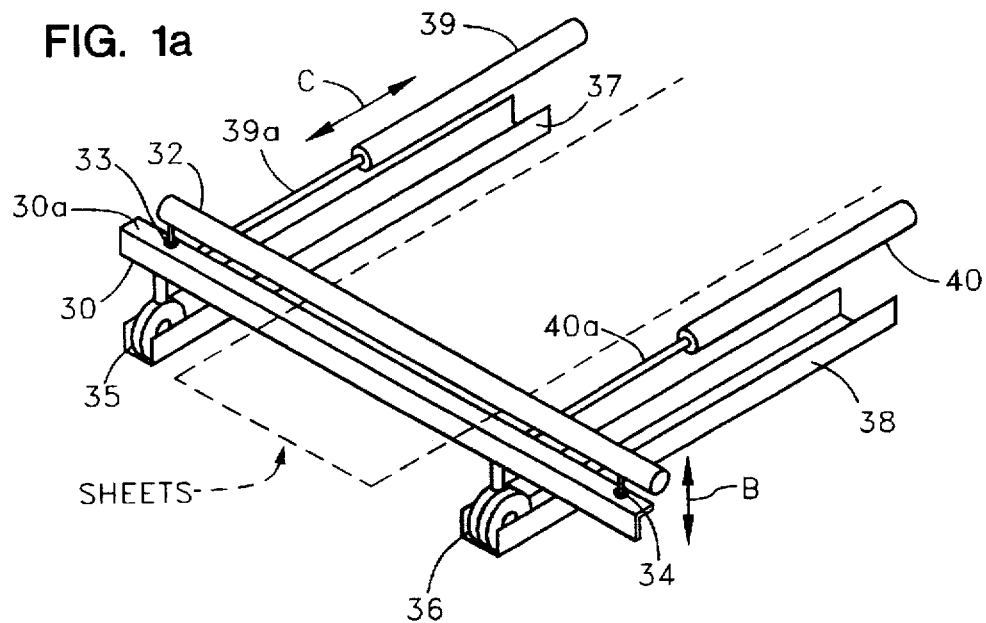
FIG. 1a is a detailed perspective view showing the manner in which pad sheets, supported by a support sheet are advanced through the apparatus of FIG. 1.
Figure 1:
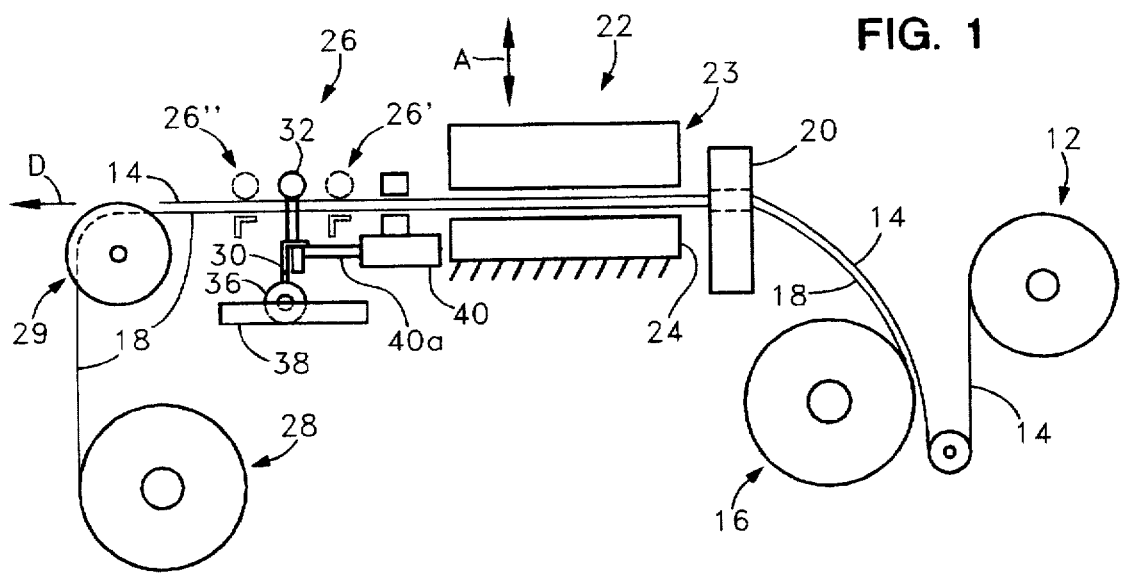
FIG. 1 shows an elevational, schematic view of apparatus for performing the pad forming and cutting operation of the present invention.
Figure 1B:
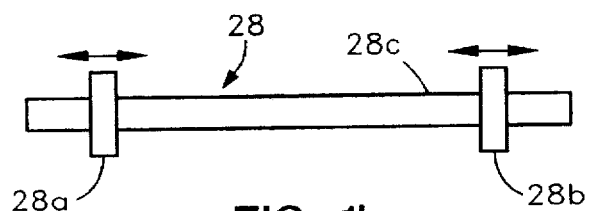
FIG. 1b shows a side view of the support sheet take-up spool of FIG. 1.

FIG. 1 shows a highly simplified schematic diagram of apparatus 10 performing the novel method of the present invention, which apparatus is comprised of a pad sheet supply spool 12 about which a laminated pad sheet 14 is wound. A support web 18 is wound about a support web supply spool 16. The laminated pad sheet 14 and support web 18 extend from right to left with the pad sheet 14 being supported by the support web 18. Pad sheet 14 and support web 18 are fed through a guide 20 and through the sealer/cutter apparatus 22 comprised of a stationary conductive bed electrode 24 and a reciprocating assembly 23 which includes a die member to be more fully described hereinbelow and having a perimeter defining electrode and a cutting blade as will be more fully described.

The sealer/cutter apparatus operates in two stages. During a first stage of an operating cycle, the reciprocating assembly 23 is moved downwardly to press the pad sheet 14 and support web 18 between conductive bed electrode 24 and the perimeter defining electrode of the die. When the perimeter defining electrode is firmly pressed into pad sheet 14, electromagnetic energy is coupled across the electrodes causing the sheets forming the laminated pad sheet to be sealed to one another (the nature of the sheets and the sealing operation being described in detail in U.S. Pat. No. 5,391, 418 which is incorporated herein by reference thereto).

A timer (not shown) times out to determine when an adequate seal has been provided and turns off the electrical energy source. Thereafter, the reciprocating assembly 23 is moved downwardly still further. The perimeter defining electrode, which is resiliently mounted upon the reciprocating assembly yields, while the cutting blade penetrates completely through the laminated pad sheet and only partially through the support web, being prevented from penetrating completely through the support web due to stops (to be more fully described) arranged upon the die assembly supporting the perimeter defining electrode and cutting blade.

The reciprocating assembly 23 is then lifted upwardly so as to be displaced from the laminated pad sheet 14 and support web 18, whereupon the advancing mechanism 26 comprised of gripping assemblies 27 and 28 are moved toward one another so as to grip sheets 14 and 18 therebetween and are then moved toward the left, thereby advancing the pad which has just been severed from the pad sheet to a position safely displaced from the sealer/cutter apparatus 22 and simultaneously moving an uncut portion of the pad sheet 14 adjacent to the portion of the pad sheet from which the last pad which has just been severed into position for the next sealing/cutting operation.

The support web 18 is wound about a take-up spool 28 and, although partially penetrated by the cutting blade, the integrity of the support web is not compromised thereby assuring that the support web supports the pad sheet and the pad which has been severed therefrom in the take-off region 30, enabling an operator to safely remove the severed pad from the supporting web.

The length of the support web 18 is at least equal to the length of the laminated pad sheet wound about supply spool 12 to assure that the support web will support all of the pads to be severed from the pad sheet wound about the pad sheet supply spool 12.

When all of the pads to be formed from a pad sheet 14 have ben severed and removed therefrom, what remains of the pad sheet is discarded and the support web, which has been wound about take-up spool 28 is rewound upon the supply spool 16 in readiness for performing sealing and cutting of a new laminated pad sheet placed upon supply spool 12. In order to significantly prolong the useful operating life of the support web, the take-up spool 28 is axially moved a given distance, typically less than an inch, prior to being rewound about supply spool 16 so as to displace the cuts formed in the support web by the cutting blade from the position of the cutting blade within the reciprocating assembly 23 to prevent blade penetrations into the supporting web from being repeatedly formed in the same positions during subsequent runs of laminated pad sheets.

FIG. 1a shows the sheet advancing structure 26 in greater detail. A bar 30 extends transversely across the path of movement of the laminated pad sheet structure 14 and support web 18 shown schematically in FIG. 1A and identified as "sheets", which sheets rest on the top surface 30A of bar 30. A second bar 32 is positioned in spaced, parallel fashion above bar 30 and is operated by cylinders 33, 34 to move vertically up or down, as is shown by double headed arrow B.

Bar 30 is supported by a pair of rollers 35, 36, each of which rolls within a U-shaped channel 37, 38, respectively. Cylinders 39, 40 having piston rods 39a, 40a are provided to move bar 30 selectively, forwardly and rearwardly as shown by double headed arrow C. The operation of the advancing assembly 26 is as follows:

The cooperating bars 30 and 32 initially occupy the position 26' shown in dotted fashion. Cylinders 33, 34 are operated so as to cause the bar 32 to be resting upon surface 30a of bar 30 to grip sheets 14 and 18 therebetween.

Upon completion of a sealing and cutting operation within the sealer/cutter apparatus 22, cylinders 39 and 40 are operated to advance bar 30 and hence bar 32 to the position 26", thereby removing the pad, which has been sealed and severed from pad sheet 14, to a take-off position to the left of the sealer/cutter apparatus 22 where the severed pad can be safely removed, it being clearly seen that support web 18 supports the pad sheet, as well as the pad severed therefrom.

Cylinders 33, 34 then operate to lift bar 32 above bar 30 whereupon cylinders 39, 40 are operated to move bars 30 and 32 to the right so as to return to the position 26' whereupon bar 32 is then lowered to grip sheets 14 and 18 therebetween.

Upon completion of another sealing/cutting operation, bar 30 is moved to the left by cylinders 39, 40. Since bar 32 is in the lowered position sheets 14 and 18 are gripped therebetween, causing the pad which has just been sealed and cut from the pad sheet to be advanced to the take-off position to the left of the sealer/cutter apparatus 22 enabling that pad to be safely removed at the take-off position.

The remains of the pad sheet 14 are moved to the left as is shown by arrow D to be discarded whereas the support web is guided about guide roll 29 and is wound about take-up roll 28.

Take-up roll 28 is comprised of a pair of collars 28a, 28b which are adjustable along the longitudinal axis of shaft 28c to accommodate support webs of differing widths. Shaft 28 is either shifted along its longitudinal axis by less than an inch or so or the collars thereon are adjusted to the left or the right, preferably by approximately ¼ (0.25) of an inch to prevent cuts in the support web from occurring in the same place after completion of sealing and cutting pads from a now exhausted supply roll of a laminated pad sheet.

Typically, the laminated pad sheet being processed is approximately 100 yards in length. By indexing the take-up spool 28 after each pad sheet supply roll is processed more than 40 such 100 yard supply rolls of laminated pad sheets can be processed before requiring replacement of the web sheet which is preferably a fish paper, although other suitable sheet material may be utilized.

To offset cuts made in the web 18, take-up spool 28 is indexed after the support web is substantially fully wound thereabout whereupon the supply spool 28 is indexed and the support web is then unwound from take-up spool 28 and is rewound about supply spool 16 preparatory to sealing and cutting pads from a new pad sheet roll 12.

FIGS. 3a, 3b and 3c show a die assembly 50 arranged along the underside of reciprocating member 23. Die assembly 50 is comprised of a planar support member 52. A pair of metallic plates 54, 56 are resiliently mounted upon member 52 by a plurality of fasteners F. Each fastener F is threaded through a helical spring S. In the example given there are four columns of fasteners arranged in five rows, each fastener being threaded through an associated spring S. The perimeter of each metallic plate 54, 56 is provided with a closed-loop projection which defines a seal bead 58, 60, respectively, the sealed beads defining the perimeter seal of a pad. Immediately surrounding each sealed bead 58, 60 and substantially conforming in shape thereto is a continuous cutter blade 62, 64, respectively.

A plurality of rigid stop members 66a through 66l are arranged at spaced intervals about support member 52 and substantially surround the cutters 62 and 64 as shown best in FIG. 3. The detailed manner in which the sealing and cutting operation is performed is as follows:

Reciprocating member 23 is moved downwardly through a first distance causing the tip 58a of sealed bead 58 (see FIG. 3a) to be firmly pressed against the top surface of laminated pad sheet 14 causing the laminated pad sheet to be firmly compressed therebetween. At this time, the cutting edge 62a of cutter 62 is displaced from the laminated pad sheet 14.

Electromagnetic energy is coupled across the metallic electrode members 54, 56 and the grounded electrode 24 sufficient to form a seal having a configuration of the beads 58, 60.

When the seal is completed, the energy source is turned off and the reciprocating member 23 is pressed further against pad sheet 14. At this time, stop members 66a–66l limit the movement of the support member 52. Conductive bead members 54 and 56 yield due to springs S so as not to interfere with or conflict with the cutting action of cutters 62, 64. The distance between the surfaces of the stops 66a–66l and the stationary member 24 is such as to enable the cutters to completely cut through the laminated pad sheet 14, but only partially through support web 18. In one preferred embodiment, the support web has a thickness of the order of 0.030 inches. The stops 66a–66l limit the depth of penetration of the cutting blades 62 and 64 into the support web by an amount in a range between 0.005 to 0.010 inches, assuring that the integrity of the support sheet is maintained whereby the support sheet continues to serve the function of supporting and conveying severed pads, together with the remaining portion of the laminated pad sheet, to a take-off location where severed pads may be easily and safely removed from the supporting surface. The above design enables the support web, which is rather expensive, to be used over and over again.

By slightly shifting take-up spool 28 before rewinding the support web upon the original supply spool 16, this assures that the cuts made by the blades 62, 64 are not made in the same precise spot during processing of subsequent laminated pad sheet supply rolls. Although the die assembly 50 provides an arrangement in which two pads are simultaneously sealed and cut during a single sealing/cutting operation, it should be understood that a greater or lesser number of such assemblies may be employed.

As an alternative to sealing and cutting laminated pad sheets in the manner shown in FIG. 1, the apparatus of FIG. 1 may be modified as shown in FIG. 2 wherein, as an alternative to a laminated pad sheet supply roll, supply rolls 12a, 12b and 12c are substituted therefor, which rolls provide the outer fibrous webs 14a, 14c and the vapor barrier web 14b forming the laminated pad sheet as is described in U.S. Pat. No. 5,391,418. In this embodiment, the die assembly 50 is modified so that the region of each of the conductive plates 54, 56 surrounded by the sealing beads 58, 60 are provided with projecting electrically conductive members which are designed to form a quilted pattern as shown, for example, by the patterns of FIGS. 2a and 2b in U.S. Pat. No. 5,391,418 which, as was mentioned hereinabove, is incorporated herein by reference thereto.

Thus, the technique of the present invention may be utilized to seal and cut pad sheets from a previously prepared laminated pad sheet or alternatively, the pad sheets maybe quilted, sealed and cut in a single operation as shown by the alternative arrangement of FIG. 4.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

what is claimed is:

1. A method for producing pads comprising the steps of:
   a) providing a substantially flat support member;
   b) feeding a non-metallic pad sheet and a support sheet onto said support member so that support sheet rests on said support and said pad sheet rests on said support sheet;
   c) providing a die member having a pattern defining a perimeter of at least one pad;
   d) providing a cutting member conforming to a perimeter of sad die member and encircling said die member;
   e) moving said die member to press said die member into said pad sheet so as to at least partially compress said pad sheet between said die member and said support member;
   f) applying electrical energy across said support and said die member for an interval sufficient, to heat seal said pattern in said pad sheet which conforms to the pattern of said die member;
   g) pressing said cutting member into said pad sheet to substantially completely sever a portion of the pad sheet from a marginal portion of the pad sheet surrounding the severed portion and partially cutting the support sheet while preventing said support sheet from being completely severed by said cutting member; and
   h) moving said cutting member and said die member away from said support sheet and pad sheet.

2. The method of claim 1 further comprising moving said support sheet and said pad sheet along said feed path and away from said support member and toward a take-off location removed from said support, said support sheet supporting said pad sheet and severed portion, enabling said severed portion to be safely removed from said pad sheet at a location spaced from the die and cutting members.

3. The method of claim 1 wherein said support sheet comprises an elongated web, said method further comprising steps of:
   a) providing first and second wind/rewind members respectively located upstream and downstream of said support member;
   b) winding an end portion of said web about said first wind/rewind member; and
   c) winding an opposite end portion of said web about said second wind/rewind member so that an intermediate portion of said web extends between said first and second wind/rewind members and across said support; and
   d) winding only said web about said second wind/rewind member as said web is advanced together with said pad sheet, whereby said web unwinds from said first wind/rewind member responsive to advancement of the support sheet.

4. The method of claim 3 further comprises the step of rewinding said support sheet about said first wind/rewind member upon completion of a desired number of sealing/cutting operations.

5. The method of claim 4 further comprising the step of shifting said web in a lateral direction each time the web is rewound about said second wind/rewind member during the formation of pads to displace cutting patterns to be made in said support sheet by said cutting member after said rewind from cutting patterns made by said cutting member previous to said rewinding operation.

6. A method for severing pads from a pad sheet comprising the steps of:
   a) providing a substantially flat support member;
   b) feeding a pad sheet and a support sheet onto said support member so that support sheet rests on said support and said pad sheet rests on said support sheet;
   c) providing a cutting member conforming to a desired shape of a pad;
   d) pressing said cutting member into said pad sheet by a distance to substantially completely sever a portion of the pad sheet from a marginal portion of the pad sheet surrounding the severed portion while preventing said support sheet from being completely severed by said cutting member, and
   e) moving said cutting member and said die member away from said support sheet and pad sheet.

7. The method of claim 6 further comprising moving said support sheet and said pad sheet along said feed path and away from said support member and toward a take-off location removed from said support member, said support sheet supporting said pad sheet and severed portion, enabling said severed portion to be safely removed from said pad sheet.

8. The method of claim 6 wherein said support sheet comprises an elongated web, said method further comprising steps of:
   a) providing first and second wind/rewind members respectively located upstream and downstream of said support member;
   b) winding an end portion of said web about said first wind/rewind member; and
   c) winding an opposite end portion of said web about said second wind/rewind member so that an intermediate portion of said web extends between said first and second wind/rewind members and across said support;
   d) winding said web about said second wind/rewind member as said web is advanced together with said pad sheet, whereby said web unwinds from said first wind/rewind member responsive to advancement of the support sheet.

9. The method of claim 6 further comprises the step of rewinding said support sheet about said first wind/rewind member upon completion of a desired number of sealing/cutting operations.

10. The method of claim 9 further comprising the step of shifting said web in a lateral direction each time the web is rewound about said second wind/rewind member during the formation of pads to displace cutting patterns to be made in said support sheet by said cutting member after said rewind from cutting patterns made by said cutting member previous to said rewinding operation.

11. A method for producing pads comprising the steps of:

a) providing a substantially flat support member;

b) providing a plurality or non-metallic plastic webs for forming a pad sheet, said webs arranged one upon the other and upon a support sheet;

c) feeding said webs and support sheet onto said support member so that said support sheet rests on said support, member and said webs are supported by said support sheet;

d) providing a die member defining a pattern to be formed in said webs;

e) providing a cutting member surrounding said die member and conforming to a shape of a pad;

f) pressing said die member into said webs so as to at least partially compress said webs between said die member and support member before the webs are cut by said cutting member;

g) applying an electrical energy across said support member and said die member for an interval sufficient to seal said webs to one another at locations engaged by said die pattern;

h) pressing said cutting member into said webs by a distance to substantially completely sever a portion of the sealed webs from marginal portions of the webs surrounding severed portions and partially sever said support sheet while preventing said support sheet from being completely severed by said cutting member; and i) moving said cutting member and said die member away from said support sheet and the webs supported thereon.

12. The method of claim 11 further comprising:

j) advancing said support sheet and said webs along said feed path and away from said support member and toward a take-off location removed from said support member, said support sheet supporting at least the severed portion, enabling said severed portion to be safely removed from the support sheet.

13. The method of claim 12 further comprising:

k) winding said support sheet about a wind-up member as said support sheet is advanced in accordance with step (j); and l) rewinding said support sheet about a second winding member located upstream relative to said support member after completion of a given number of pad forming and cutting operations and in readiness for performing a subsequent series of pad forming and cutting operations.

14. The method of claim 13 further comprising:

m) laterally moving the support sheet a given distance preparatory to performing another series of pad forming and cutting operations to displace cuts formed in said support sheet by the cutting member from cuts to be formed during a subsequent series of cutting operations.

15. The method of claim 1 wherein step (e) further includes moving both said cutting member and said die member towards the pad sheet so that said die member engages the pad sheet before the cutting member.

16. The method of claim 1 wherein said pad sheet includes a plurality of non-metallic sheet members and step (f) includes heat sealing the pad sheet members together employing dielectric energy.

17. The method of claim 16 wherein the dielectric energy is applied across said die and said support member.

18. The method of claim 11 wherein said pad sheet includes a plurality of non-metallic sheet members and step (f) includes heat sealing the pad sheet members together employing dielectric energy.

19. The method of claim 18 wherein the dielectric energy is applied across said die and said support member.

* * * * *

UNITED STATES PATENT AND TRADEMARK OFFICE
CERTIFICATE OF CORRECTION

PATENT NO. : 5,735,991
DATED : April 7, 1998
INVENTOR(S) : Bruce Strongwater

It is certified that error appears in the above-indentified patent and that said Letters Patent is hereby corrected as shown below:

Column 7, line 38, delete "sad" and insert --said--.

Column 9, line 11, delete "or" and insert --of--.

In The Abstract, at line 8, delete "per/meter" and insert --perimeter--.

Signed and Sealed this

Eighth Day of September, 1998

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,735,991
DATED : April 7, 1998
INVENTOR(S) : Bruce Strongwater

It is certified that error appears in the above-identified patent and that said Letters Patent is hereby corrected as shown below:

On the title page, item [ 73 ] Assignee: change the Assignee's name to -- J. Lamb, Inc. Englewood, NJ --.

Signed and Sealed this

Twenty-third Day of February, 1999

Attest:

Q. TODD DICKINSON

*Attesting Officer*  *Acting Commissioner of Patents and Trademarks*